(12) United States Patent
Feightner et al.

(10) Patent No.: US 8,243,021 B2
(45) Date of Patent: Aug. 14, 2012

(54) SLIDE AND ROTATE DISPLAY CONFIGURATIONS FOR A HANDHELD COMPUTING DEVICE

(75) Inventors: Rick Feightner, West Linn, OR (US);
Wah Yiu Kwong, Beaverton, OR (US);
Katherine Mills, Portland, OR (US);
George K. Korinsky, Portland, OR (US); Khanh Q Tran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 11/394,869

(22) Filed: Mar. 31, 2006

(65) Prior Publication Data

US 2007/0232368 A1    Oct. 4, 2007

(51) Int. Cl.
*G06F 3/02* (2006.01)
*G09G 5/00* (2006.01)

(52) U.S. Cl. .......... 345/169; 455/575.4; 455/550.1; 455/556.2; 361/679.39; D14/138 R; D14/138 AD; 345/173; 345/901

(58) Field of Classification Search .......... 455/550.1, 455/90.3, 575.1, 566, 556.2; 361/679.01–679.09, 361/679.1, 679.39; D14/138 R, 138 AD; 345/169, 173, 156, 901
See application file for complete search history.

(56) References Cited

U.S. PATENT DOCUMENTS

| | | | |
|---|---|---|---|
| 6,850,784 B2 * | 2/2005 | SanGiovanni | 455/575.1 |
| 2003/0064688 A1 * | 4/2003 | Mizuta et al. | 455/90 |
| 2003/0064758 A1 * | 4/2003 | Mizuta et al. | 455/566 |
| 2004/0048632 A1 * | 3/2004 | Kuroda | 455/550.1 |
| 2004/0137940 A1 * | 7/2004 | Matsunami | 455/550.1 |
| 2004/0198460 A1 * | 10/2004 | Sakuta et al. | 455/566 |
| 2004/0203527 A1 * | 10/2004 | Matsumoto | 455/90.3 |
| 2005/0082372 A1 * | 4/2005 | Lee et al. | 235/472.01 |
| 2005/0130715 A1 * | 6/2005 | Fujisawa | 455/575.1 |

OTHER PUBLICATIONS

"CEBIT in 2006", SOGI.com.tw, (published prior to Mar. 31, 2006), 1 pg.

* cited by examiner

*Primary Examiner* — Lun-Yi Lao
*Assistant Examiner* — Insa Sadio
(74) *Attorney, Agent, or Firm* — Schwegman, Lundberg & Woessner, P.A.

(57) ABSTRACT

Apparatus, systems, and methods described herein may couple a base component associated with a portable electronic device (PED) to a display component associated with the PED such that the display component is capable of sliding and rotating relative to the base component. Other embodiments may be described and claimed.

25 Claims, 9 Drawing Sheets

SLIDE AND ROTATE DISPLAY CONFIGURATIONS FOR A HANDHELD COMPUTING DEVICE

TECHNICAL FIELD

Various embodiments described herein relate to portable electronic devices generally, including apparatus, systems, and methods related to input device access and display orientation.

BACKGROUND INFORMATION

An industrial design associated with a portable electronic device (PED) may consider a variety of factors, including minimizing an overall device size, maximizing a display size, and on-demand access to input devices, among others. Resulting three dimensional solutions may include a so-called "clamshell" design. The clamshell design may utilize a hinge to enable lifting the display to expose the input devices, including perhaps a keyboard. Some embodiments of the clamshell design may utilize a dual-purpose hinge to enable lifting and rotating the display 180 degrees to support a tablet configuration.

The clamshell design may be well-suited to certain applications, including perhaps a notebook computer application and a cellular telephone application. However, the clamshell design may not provide adequate on-demand access to the input devices for a hand-held computer. Deploying the display associated with a clamshell PED may expose most or all of the input devices hidden by the display when only a few of the input devices are required for a particular task. A larger-than-necessary overall device size in the deployed configuration may result. A latency associated with opening the clamshell PED may prove bothersome, especially if the PED is used frequently.

DETAILED DESCRIPTION

Figure 1:
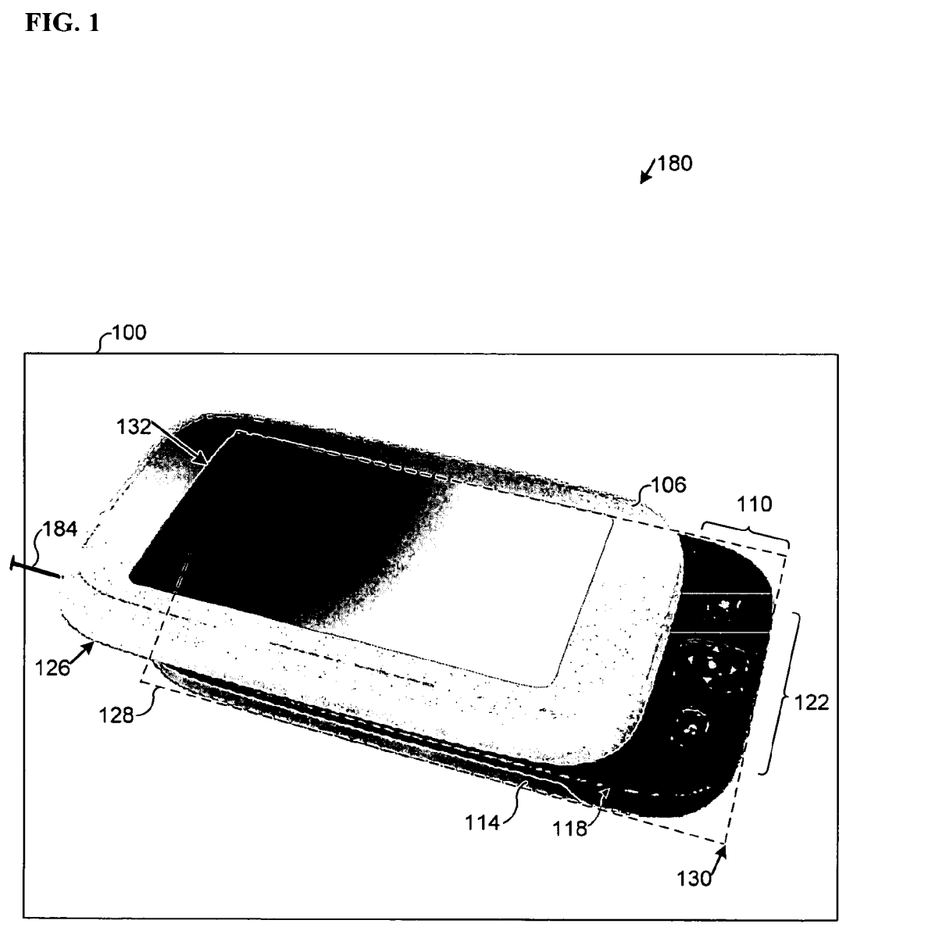
FIGS. 1 and 2 are pictorial diagrams of a representative portable electronic device according to various embodiments.
Figure 2:
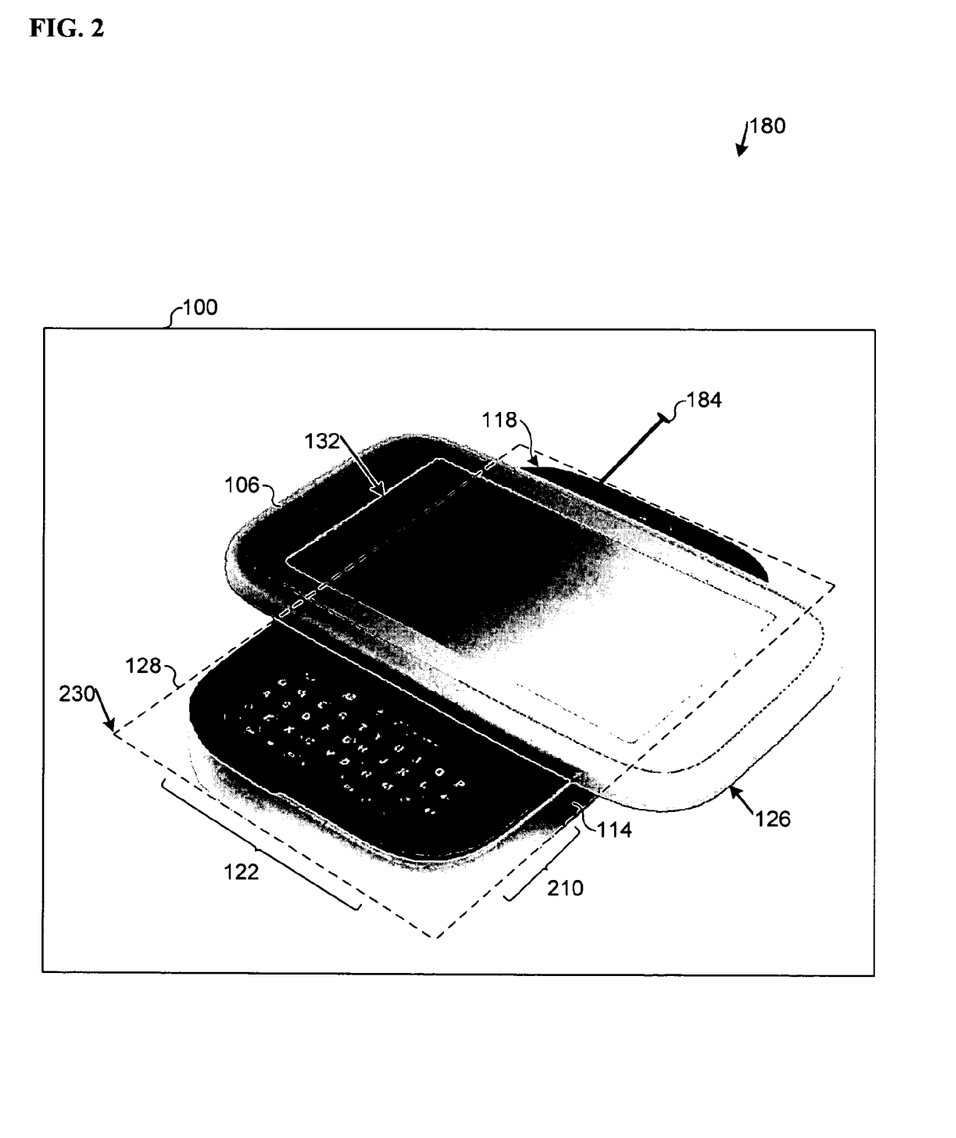

FIGS. 1 and 2 are pictorial diagrams of a portable electronic device (PED) 100 and a system 180 according to various embodiments of the invention. The PED 100 may comprise a hand-held computing device or a cellular telephone, among other types of PED. The hand-held computing device may comprise a category of personal computer (PC) referred to as an "ultra-mobile PC" (UMPC). The UMPC may be useful in applications related to both personal productivity and entertainment. Applications available at the UMPC may include Internet access, location-based services, e-mail, editing of office documents, and viewing of television and movie content, among others.

Embodiments of the invention may selectively conceal or expose various clusters of features and input devices supporting various usage models. Unlike a clamshell design that opens to an essentially three-dimensional configuration, disclosed embodiments may expose the features and input devices while maintaining a generally two-dimensional configuration. For example, some embodiments may incorporate an end to end sliding and/or rotating display component 106 to expose a choice of productivity usages. E-mail and office applications utilizing a thumb keyboard 210 (shown on FIG. 2) may be exposed at one end of the UMPC. One or more entertainment input devices 110 (e.g., a game joystick and multimedia buttons) may be selectively exposed at the other end.

Some embodiments may include a mechanism to enable a sliding and rotating action between the display component 106 and a base component 114. The mechanism may permit a rotation of the display component 106 at various positions along a length associated with the sliding action. The display component 106 may snap into place at various increments of sliding and/or rotating action to provide stopping points for a user to interact with the PED 100. Some embodiments may include a release button or latch, and may perform the sliding and/or rotating action under motorized or spring-loaded power upon depressing or releasing the button or latch. The term "sliding and rotating" is meant to convey the idea that the display component 106 and the base component 114 are capable of moving with respect to each other by sliding, by rotating, or both, in any order.

The PED 100 may thus include the display component 106 and the base component 114. The base component 114 may comprise a first substantially flat surface 118. The first substantially flat surface 118 may present one or more input devices 122 for access by a user of the PED 100. The display component 106 may be slidably and rotatively coupled to the base component 114 to selectively expose the input device(s) 122.

The input device(s) 122 may be clustered at various positions around and inside a perimeter 128 of the base component 114. The plurality of input devices may be recessed into the first substantially flat surface 118. In some embodiments of the PED 100, the input device(s) 122 may include alphanumeric keys located along one edge 230 of the perimeter 128 of the base component 114. The input device(s) 122 may also include the entertainment input device(s) 110 located along an opposite edge 130 of the perimeter 128 associated with the base component 114. Examples of the input device(s) 122 may include a keypad, a pushbutton switch, a rocker switch, a slider device, a joystick, a touchpad, a proximity device, an iris scanner, a facial features scanner, a barcode scanner, a radio-frequency identification device scanner, and a finger print scanner, among others.

Although two clusters of the input device(s) 122 are shown in the example embodiment of FIG. 1 and FIG. 2, some embodiments may include additional clusters of the input device(s) 122. In some embodiments, the input device(s) 122, or clusters thereof, may comprise a modular plug-in to the base component 114.

A second substantially flat surface 126 may be located on a broad side of the display component 106. The second substantially flat surface 126 may be capable of sliding to positions adjacent the first substantially flat surface 118 as the display component 106 is moved relative to the base component 114.

A display surface 132 may be located on a side of the display component 106 opposite the second substantially flat surface 126. The display surface 132 may be used to present images in one or more visual orientations relative to the input device(s) 122. Visual orientations may, for example, include a portrait orientation, a landscape orientation, or both.

Figure 3:
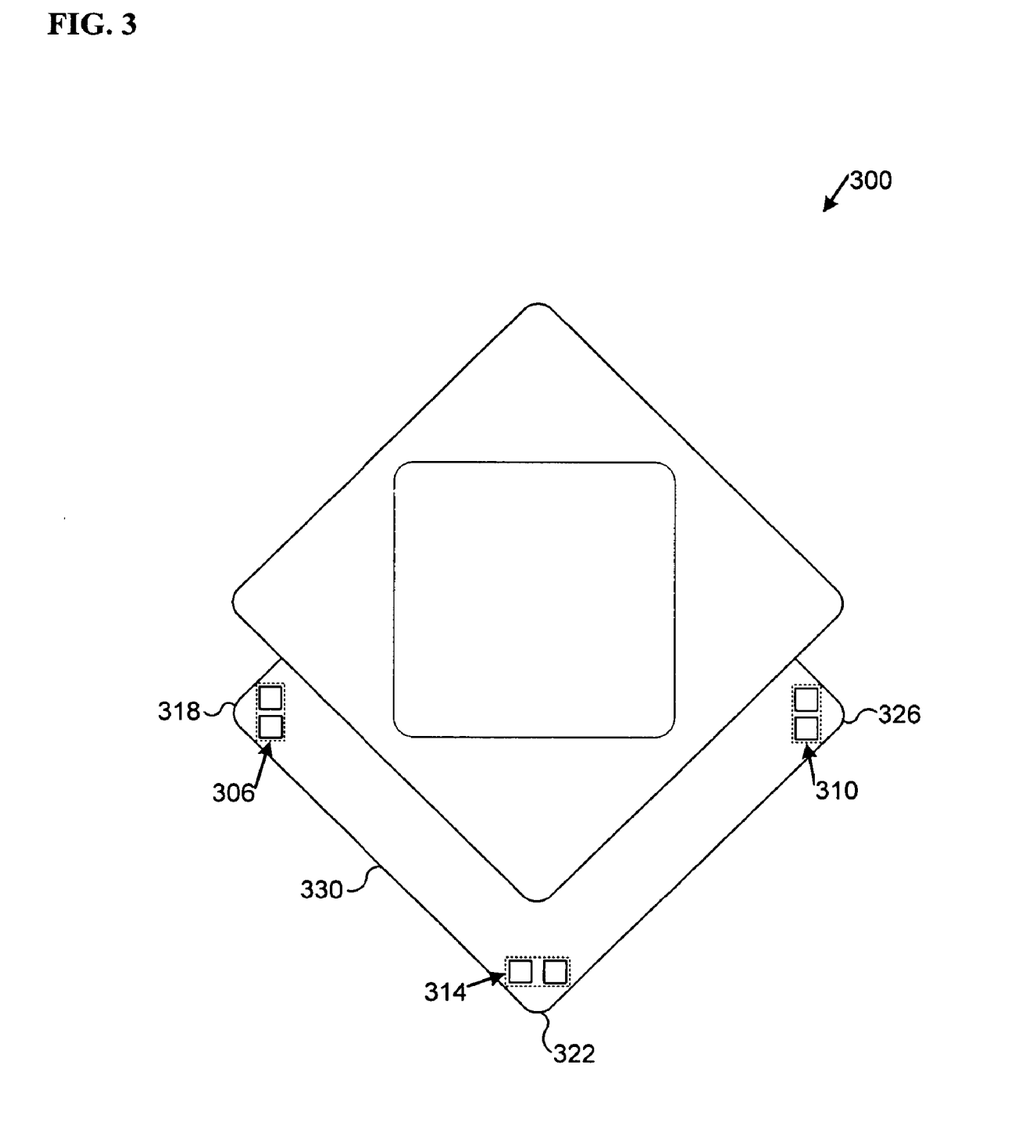
FIG. 3 is a pictorial diagram of another representative portable electronic device according to various embodiments.

The PED 100 may be embodied in various shapes. A shape may be generally similar to an outline of the base component 114 or the display component 106. The shape may comprise a generally elliptical shape, a generally oval shape, or a generally polygonal shape, among other possible shapes. For example, a square-shaped embodiment 300 is shown in FIG. 3. The square-shaped embodiment 300 may include one or more clusters of input devices 306, 310, and 314. The cluster(s) of input devices 306, 310, 314 may be located at corner positions 318, 322, and 326, respectively, of a base component 330. The example square embodiment 300 may be useful as a gaming device, among other uses.

Figure 4:
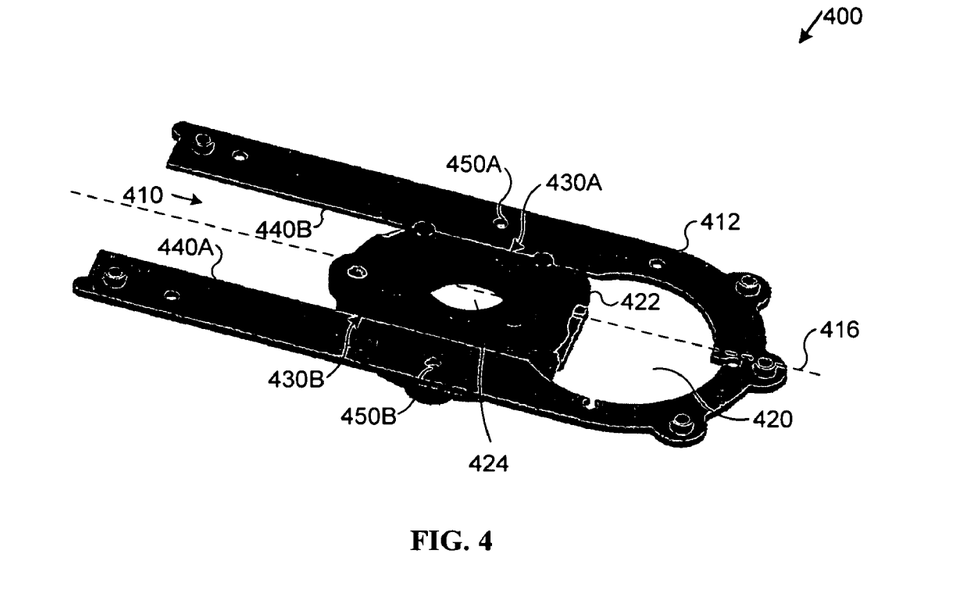
FIGS. 4 and 5 are pictorial diagrams of a representative slide and rotate mechanism according to various embodiments.
Figure 5:
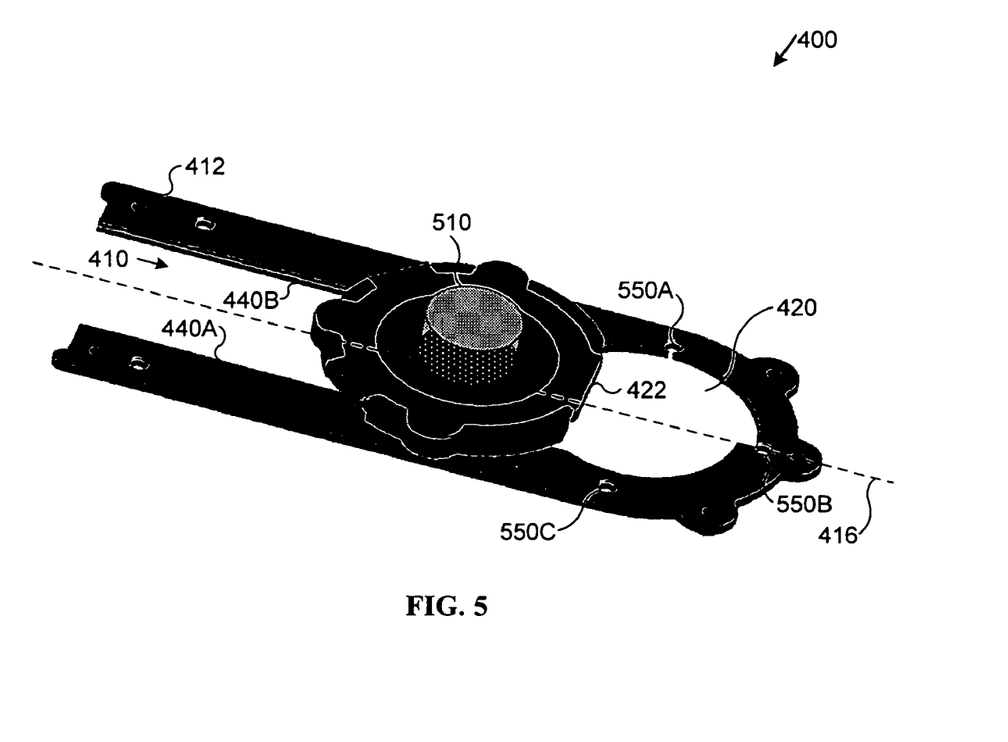

FIG. 4 and FIG. 5 are views from opposite sides of an example slide and rotate mechanism 400 associated with the PED 100. The slide and rotate mechanism 400 may be coupled to the base component 114 and to the display component 106. The slide and rotate mechanism 400 may slidably and rotatively couple the display component 106 to the base component 114.

The slide and rotate mechanism 400 may comprise one or more elongated channels 410 formed in the base component 114, in the display component 106, and/or in a wear plate 412. The elongated channel(s) 410 may lie substantially coplanar with the first substantially flat surface 118, the second substantially flat surface 126, or both. The elongated channel(s) 410 may form an axis 416 along which to slide the display component 106 relative to the base component 114. The elongated channel(s) 410 may enable access to the input device(s) 122 located at the various positions around and inside the perimeter 128 of the base component 114.

The elongated channel(s) 410 may widen to form one or more circular channels 420 at one or more points along a length of the elongated channel(s) 410. The circular channel(s) 420 may permit a rotation of the display component 106 relative to the base component 114 at the point(s) along the length of the elongated channel(s) 410.

The slide and rotate mechanism 400 may also comprise a slide block assembly 422. The slide block assembly 422 may be fastened to the base component 114, the display component 106, or both. The slide block assembly 422 may fit into the elongated channel(s) 410 and may slide within the elongated channel(s) 410. In an alternate embodiment, a cylindrical member 510 may rotate within a circular channel 424 associated with the slide block assembly 422 to enable the rotation of the display component 106.

Figure 6:
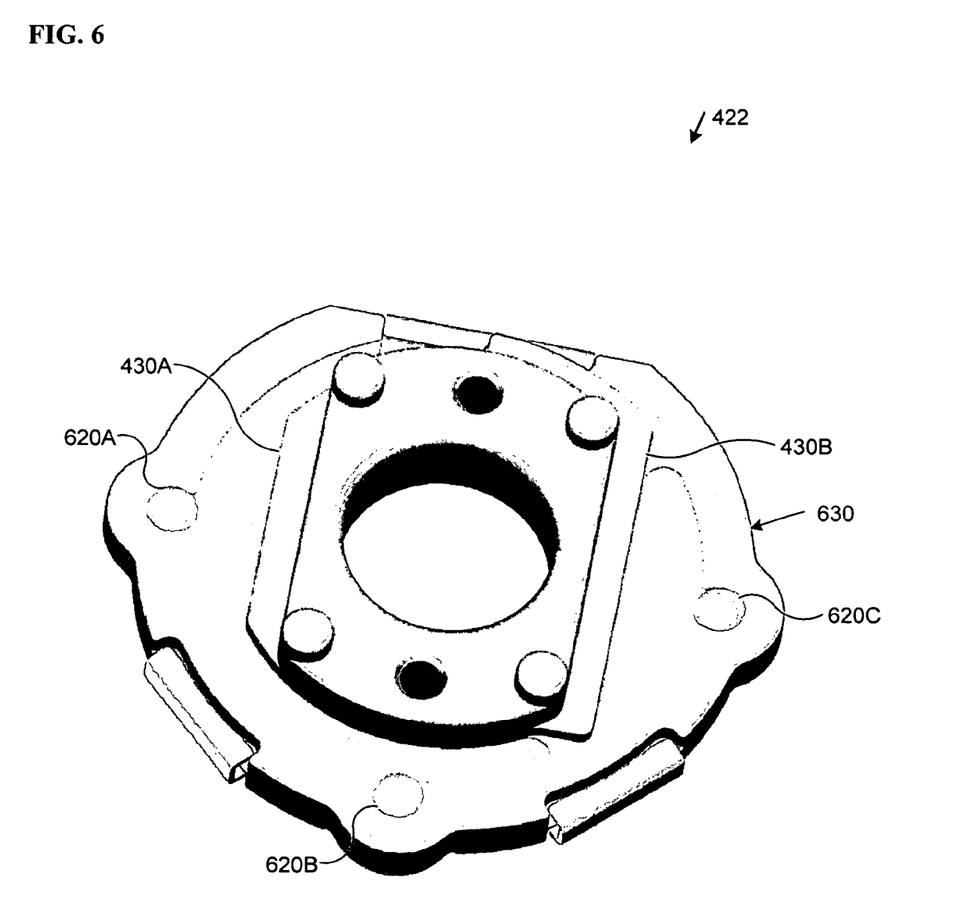
FIG. 6 is a pictorial diagram of a slide block assembly according to various embodiments.

The slide block assembly 422, shown in greater detail in FIG. 6, may be configured with flat sides 430A and 430B. The flat sides 430A, 430B may extend into a thickness of the elongated channel(s) 410. The flat sides 430A, 430B may contact inside edges 440A and 440B of the elongated channel(s) 410 to permit a sliding motion along the axis 416. The flat sides 430A, 430B may also prohibit a rotational motion of the slide block assembly 422 except at the circular channel(s) 420.

Figure 7:
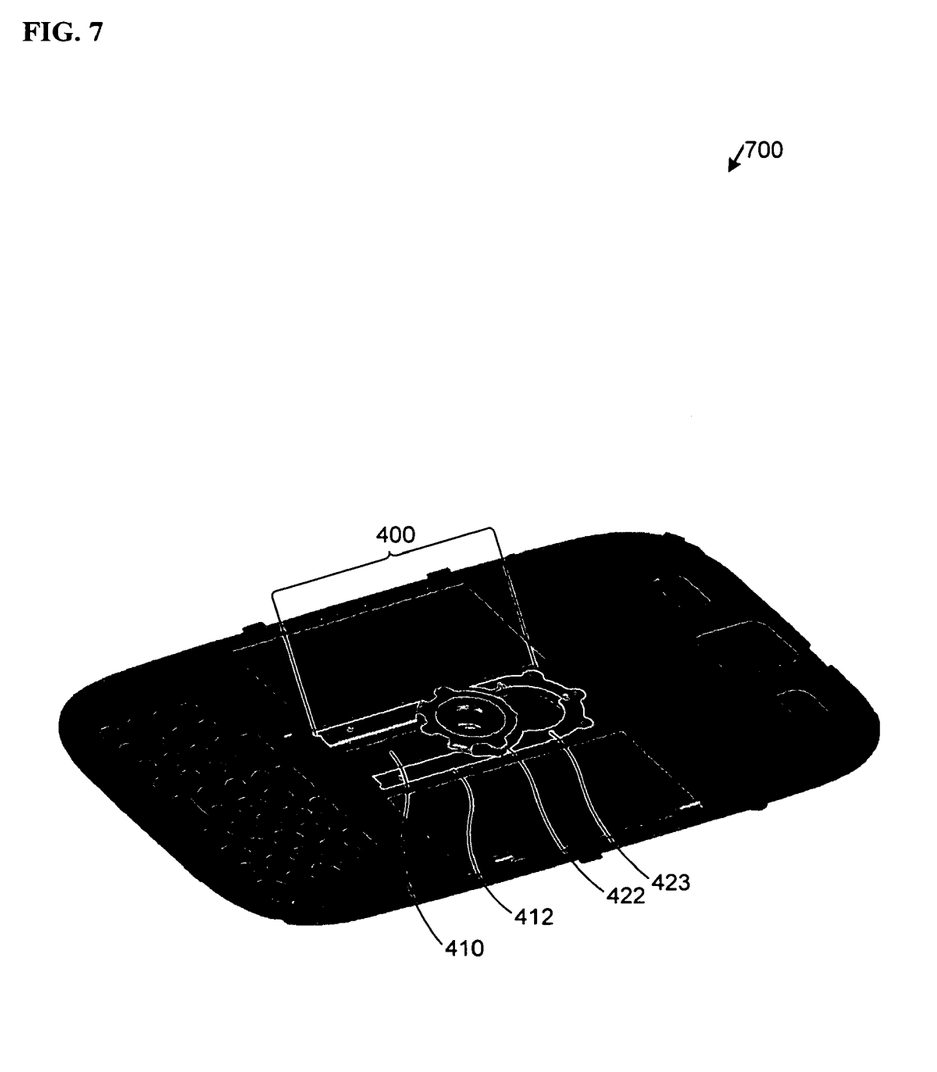
FIG. 7 is a pictorial diagram of a representative portable electronic device with a representative slide and rotate mechanism installed therein.

FIG. 7 is a pictorial diagram of an example slide and rotate PED assembly 700, including the slide and rotate mechanism 400 installed thereon. The wear plate 412 may contact the slide block assembly 422 during sliding operations, rotating operations, or both. The PED assembly 70 may also include an electrical contact 423 associated with the slide and rotate mechanism 400. The electrical contact 423 may trigger an electronic rotation of the images on the display surface 132. The images may be rotated electronically to create the first visual orientation or the second visual orientation, or to establish a visual orientation consistent with a physical position of the display component 106.

Figure 8:
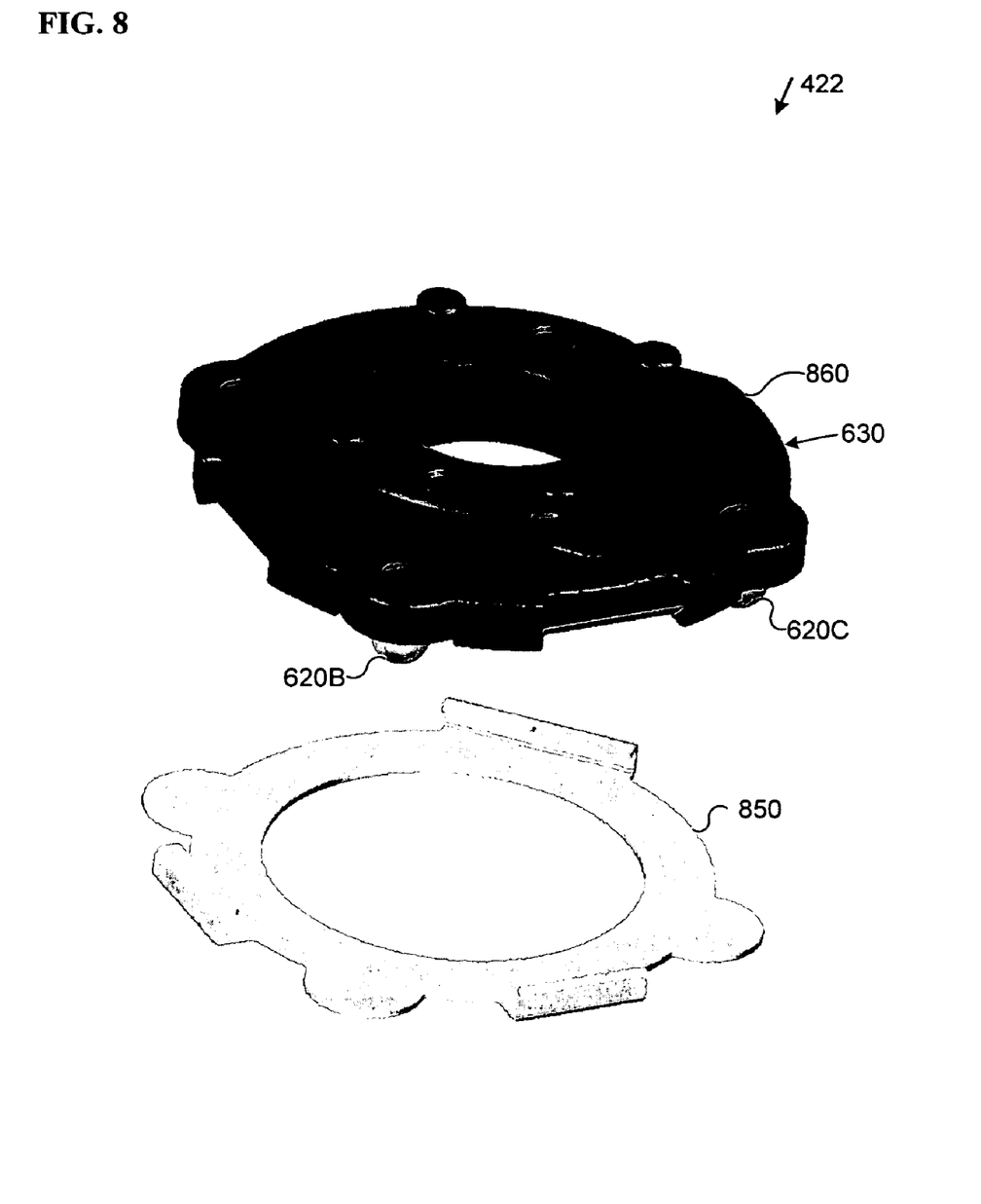
FIG. 8 is a pictorial diagram of components of a slide block assembly.

FIG. 6 and FIG. 8 show a set of spring-loaded lock pins 620A, 620B, and 620C. The lock pins 620A, 620B, 620C may be ball-shaped or cylindrically-shaped, among other shapes. The lock pins 620A, 620B, 620C may extend from a surface 630 of the slide block assembly 422 and may snap into a set of recesses 450A, 450B, 550A, 550B, and 550C shown in FIG. 4 and FIG. 5. Other sets of recesses may be located at various positions along the length of the elongated channel(s) 410 and around a circumference associated with the circular channel(s) 420. The set of spring-loaded lock pins 620A, 620B, 620C and the set of recesses 450A, 450B, 550A, 550B, 550C may establish a detent at selected positions along the length of the elongated channel(s) 410 and at selected positions around the circumference of the circular channel(s) 420. A spring plate 850 may be fastened to a slide block 860 to retain the set of lock pins 620A, 620B, 620C and to provide spring tension to the set of lock pins 620A, 620B, 620C.

In another embodiment, shown in FIG. 1 and FIG. 2, a portable electronic system 180 may include one or more of the PED 100, as previously described. The system 180 may also include an antenna 184 coupled to the base component 114, to the display component 106, or to both to enable wireless communication. The antenna 184 may comprise a patch, omnidirectional, beam, slot, monopole, or dipole, among other types.

Any of the components previously described may be implemented, emulated, or simulated in a number of ways, including embodiments in software. Thus, the PED 100; display component 106; entertainment input device(s) 110; thumb keyboard 210; base component 114; substantially flat surfaces 118, 126; input device(s) 122; perimeter 128; edges 130, 230; display surface 132; square-shaped embodiment 300; clusters of input devices 306, 310, 314; corner positions 318, 322, 326; base component 330; slide and rotate mechanism 400; elongated channel(s) 410; wear plate 412; axis 416; circular channel(s) 420, 424; slide block assembly 422; electrical contact 423; flat sides 430A, 430B; inside edges 440A, 440B; cylindrical member 510; PED assembly 700; spring-loaded lock pins 620A, 620B, 620C; surface 630; recesses 450A, 450B, 550A, 550B, 550C; spring plate 850; slide block 860; portable electronic system 180; and antenna 184 may all be characterized as "modules" herein.

The modules may include hardware circuitry, single or multi-processor circuits, memory circuits, software program modules and objects, firmware, and combinations thereof, as desired by the architect of the PED 100 and the system 180 and as appropriate for particular implementations of various embodiments.

The apparatus and systems of various embodiments may be useful in applications other than sliding and rotating PED display and base components relative to each other to selectively expose one or more input devices. Thus, various embodiments of the invention are not to be so limited. The illustrations of the PED 100 and the system 180 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, wearable computing devices, etc.), workstations, radios, video players, audio players (e.g., mp3 players), vehicles, medical devices (e.g., heart monitor, blood pressure monitor, etc.) and others. Some embodiments may include a number of methods.

Figure 9:
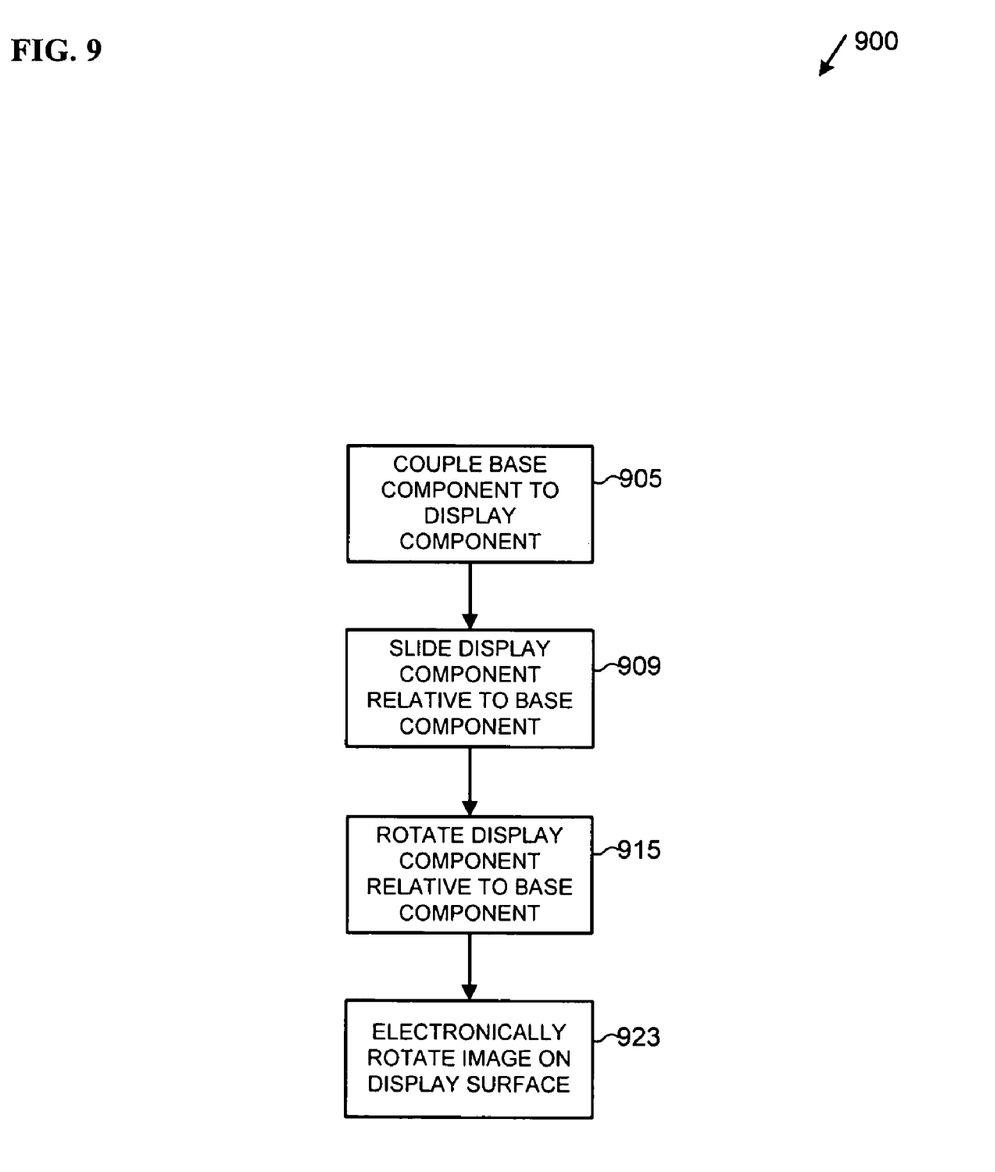
FIG. 9 is a flow diagram illustrating several methods according to various embodiments.

FIG. 9 is a flow diagram illustrating several methods according to various embodiments. A method 900 may commence at block 905 with coupling a base component associated with a portable electronic device (PED) to a display component associated with the PED. The base component and the display component may be coupled such that the display component is capable of sliding and rotating relative to the base component.

The base component may comprise a first substantially flat surface to present a plurality of input devices. The display component may comprise a display surface and a second substantially flat surface. The second substantially flat surface may be located on a broad side of the display component opposite the display surface, as previously described. The first and second substantially flat surfaces may be capable of sliding adjacent one another. The plurality of input devices may be recessed into the first substantially flat surface and may be clustered at a plurality of positions around and inside a perimeter of the base component.

The method 900 may include sliding the display component relative to the base component to selectively expose one or more input devices, at block 909. The method 900 may also include rotating the display component relative to the base component, at block 915. An image on the display surface may thus be presented in a first visual orientation relative to the input device(s), a second visual orientation relative to the input device(s), or both. The method 900 may conclude at block 923 with electronically rotating the image on the display surface to create the first visual orientation or the second visual orientation.

It may be possible to execute the activities described herein in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 10 below.

Figure 10:
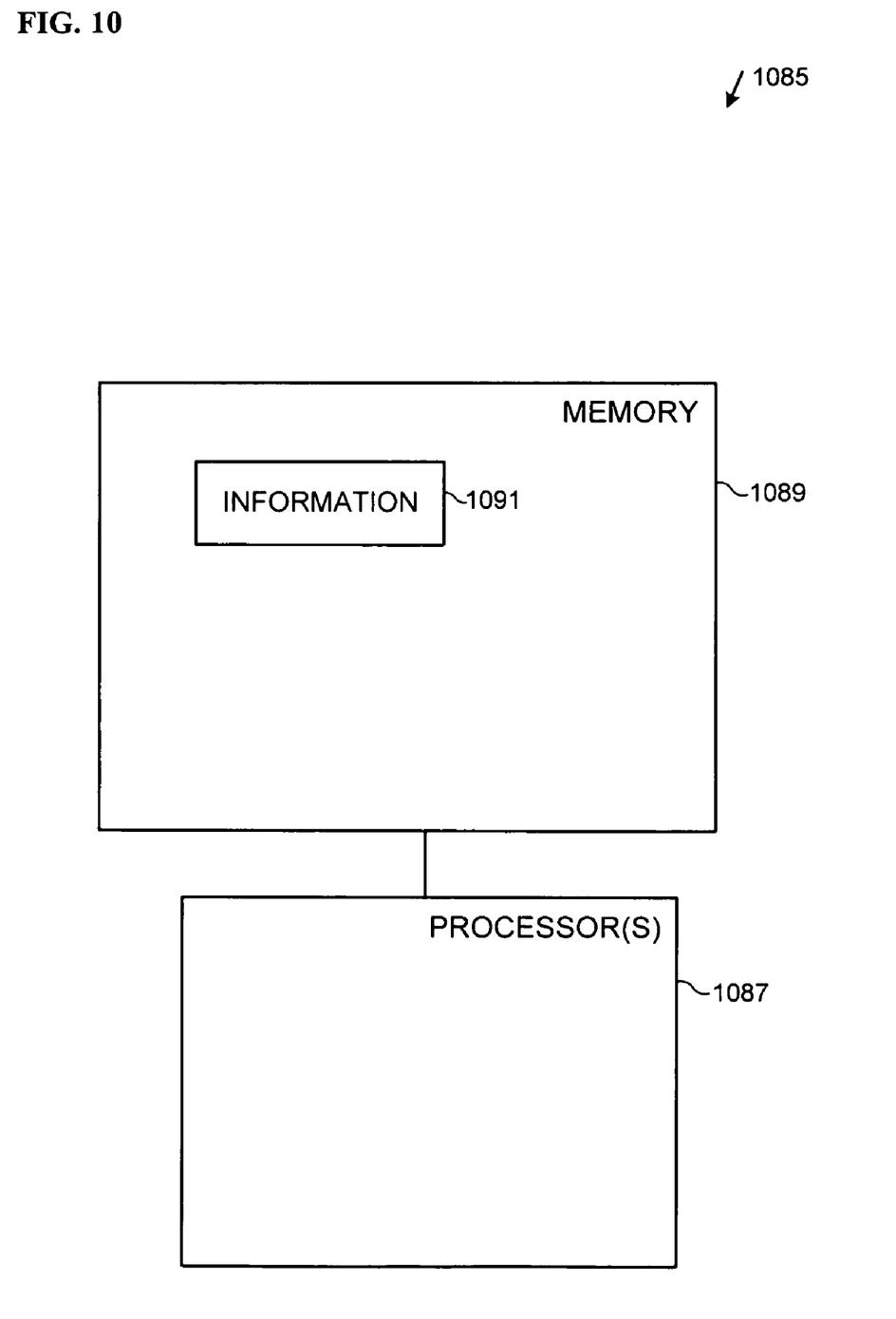
FIG. 10 is a block diagram of an article according to various embodiments.

FIG. 10 is a block diagram of an article 1085 according to various embodiments of the invention. Examples of such embodiments may comprise a computer, a memory system, a magnetic or optical disk, some other storage device, or any type of electronic device or system. The article 1085 may include one or more processor(s) 1087 coupled to a machine-accessible medium such as a memory 1089 (e.g., a memory including electrical, optical, or electromagnetic elements). The medium may contain associated information 1091 (e.g., computer program instructions, data, or both) which, when accessed, results in a machine (e.g., the processor(s) 1087) performing the activities previously described.

Implementing the apparatus, systems, and methods disclosed herein may enable a user of a PED to slide and/or rotate a display component associated with the PED relative to a base component in order to selectively expose one or more input devices. These characteristics may contribute to an enhanced user experience by providing ready access to a variety of input functions, and may result in a relatively smaller form factor than with previous designs.

Although the inventive concept may include embodiments described in the exemplary context of an IEEE standard 802.xx implementation (e.g., 802.11, 802.11a, 802.11b, 802.11E, 802.11g, 802.16, etc.), the claims are not so limited. Additional information regarding the IEEE 802.11 standard may be found in "ANSI/IEEE Std. 802.11, Information technology—Telecommunications and information exchange between systems—Local and metropolitan area networks-Specific requirements—Part 11: Wireless LAN Medium Access Control (MAC) and Physical Layer (PHY) Specifications" (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11E standard may be found in "IEEE 802.11E Standard for Information technology—Telecommunications and information exchange between systems—Local and metropolitan area networks-Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of any wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A portable electronic device, including:
   a base component comprising a first substantially flat surface to present a plurality of input devices, the plurality of input devices including a first cluster of input keys and a second cluster of input keys, the first cluster of input keys formed at one end of the first substantially flat surface and the second cluster of input keys formed at an opposite end of the first substantially flat surface; and
   a display component slidably and rotatively coupled to the base component to selectively expose at least one input device selected from the plurality of input devices, the display component, when fully slid to a first direction, capable of exposing the first cluster of input keys and simultaneously concealing the second cluster of input keys, the display component, when fully slid to a second direction opposite to the first direction, capable of exposing the second cluster of input keys and simultaneously concealing the first cluster of input keys, the display component capable of horizontally rotating relative to the base component at two or more different positions along a length associated with a sliding action of the display component, the display component coupled to the base component using a slide block comprising a pair of channel contact sides formed on a first surface of the slide block to enable the sliding, and a cylindrical member formed on a second surface of the slide block to enable the rotating, the cylindrical member configured to rotate within a circular channel formed on the first surface between the pair of channel contact sides.

2. The portable electronic device of claim 1, wherein the display component comprises:
   a second substantially flat surface on a broad side of the display component, the second substantially flat surface capable of sliding adjacent the first substantially flat surface associated with the base component; and
   a display surface on a side of the display component opposite the second substantially flat surface to present images in at least one of a first visual orientation relative to the at least one input device or a second visual orientation relative to the at least one input device.

3. The portable electronic device of claim 2, wherein the first visual orientation and the second visual orientation comprise at least one of a portrait orientation or a landscape orientation.

4. The portable electronic device of claim 2, further including:
   a slide and rotate mechanism comprising the slide block coupled to the base component and to the display component to slidably and rotatively couple the display component to the base component.

5. The portable electronic device of claim 4, wherein the slide and rotate mechanism comprises:
   at least one elongated channel formed in at least one of the base component, the display component, or a wear plate, the at least one elongated channel substantially coplanar with at least one of the first substantially flat surface or the second substantially flat surface, wherein the at least one elongated channel forms an axis along which to slide the display component relative to the base component; and
   a slide block assembly comprising the slide block and fastened to at least one of the base component or the display component, the slide block assembly to fit into the at least one elongated channel and to slide within the at least one elongated channel guided by the pair of the channel contact sides.

6. The portable electronic device of claim 5, wherein the at least one elongated channel widens to form a circular channel at least one point along a length of the at least one elongated channel.

7. The portable electronic device of claim 6, wherein the pair of the channel contact sides extends into a thickness of the elongated channel to contact inside edges of the elongated channel to permit a sliding motion along the axis and to prohibit a rotational motion of the slide block assembly except at the circular channel.

8. The portable electronic device of claim 5, wherein the wear plate contacts the slide block assembly during at least one of sliding operations and rotating operations.

9. The portable electronic device of claim 8, further including:
   a set of spring-loaded lock pins to extend from a surface of the slide block assembly in contact with at least one of the wear plate or a side of the at least one elongated channel and to snap into a set of recesses, the set of recesses located at least one of positions along the length of the at least one elongated channel or positions around a circumference associated with the circular channel, the set of spring-loaded lock pins and the set of recesses to establish a detent at selected positions along the length of the at least one elongated channel or at selected positions around the circumference associated with the circular channel.

10. The portable electronic device of claim 9, wherein the lock pins are ball-shaped.

11. The portable electronic device of claim 9, further including:
a spring plate fastened to a slide block associated with the slide block assembly to retain the set of lock pins and to provide spring tension to the set of lock pins.

12. The portable electronic device of claim 4, further including:
an electrical contact associated with the slide and rotate mechanism to electronically rotate the images on the display surface to create at least one of the first visual orientation or the second visual orientation.

13. The portable electronic device of claim 1, wherein a shape generally similar to an outline of at least one of the base component or the display component comprises at least one of a generally elliptical shape, a generally oval shape, or a generally polygonal shape.

14. The portable electronic device of claim 1, wherein the plurality of input devices are recessed into the first substantially flat surface and are clustered at a plurality of positions around and inside a perimeter of the base component.

15. The portable electronic device of claim 14, wherein the first cluster of input keys comprises a cluster of alphanumeric keys located along one edge of the perimeter of the base component and wherein the second cluster of input keys comprises at least one multimedia input device located along an opposite edge of the perimeter of the base component.

16. A portable electronic system, including:
a base component comprising a first substantially flat surface to present a plurality of input devices, the plurality of input devices including a first cluster of input keys and a second cluster of input keys, the first cluster of input keys formed at one end of the first substantially flat surface and the second cluster of input keys formed at an opposite end of the first substantially flat surface; and
a display component comprising a display surface and a second substantially flat surface on a broad side of the display component opposite the display surface, wherein the display component is slidably and rotatively coupled to the base component to selectively expose at least one input device selected from the plurality of input devices and to present images on the display surface in at least one of a first visual orientation relative to the at least one input device or a second visual orientation relative to the at least one input device, wherein the display component, when fully slid to a first direction, is capable of exposing the first cluster of input keys and simultaneously concealing the second cluster of input keys, wherein the display component, when fully slid to a second direction opposite to the first direction, is capable of exposing the second cluster of input keys and simultaneously concealing the first cluster of input keys, and wherein the display component is capable of horizontally rotating relative to the base component at two or more different positions along a length associated with a sliding action of the display component.

17. The portable electronic system of claim 16, comprising a hand-held computing device.

18. The portable electronic system of claim 17, wherein the at least one input device comprises at least one of a keypad, a pushbutton switch, a rocker switch, a slider device, a joystick, a touchpad, a capacitive proximity device, an iris scanner, a facial features scanner, a barcode scanner, a radio-frequency identification device scanner, or a finger print scanner.

19. The portable electronic system of claim 16, wherein the at least one input device comprises a modular plug-in to the base component.

20. A portable electronic device, including:
a base component comprising a first substantially flat surface to present a plurality of input devices, the plurality of input devices including a first cluster of input keys and a second cluster of input keys, the first cluster of input keys formed at one end of the first substantially flat surface and the second cluster of input keys formed at an opposite end of the first substantially flat surface; and
a display component slidably and rotatively coupled to the base component to selectively expose at least one input device selected from the plurality of input devices, the display component, when fully slid to a first direction, capable of exposing the first cluster of input keys and simultaneously concealing the second cluster of input keys, the display component, when fully slid to a second direction opposite to the first direction, capable of exposing the second cluster of input keys and simultaneously concealing the first cluster of input keys, the display component capable of horizontally rotating relative to the base component at two or more different positions along a length associated with the sliding action of the display component, the two or more different positions including a first position and a second position, the display component, when fully rotated at the first position horizontally relative to the base component, capable of exposing the first and second clusters of input keys simultaneously, and the display component, when fully rotated at the second position horizontally relative to the base component, capable of exposing a first one of the first and second clusters of input keys and simultaneously concealing a second one of the first and second clusters of input keys.

21. The portable electronic device of claim 20, wherein the display component comprises a display surface and a second substantially flat surface on a broad side of the display component opposite the display surface, and wherein the first substantially flat surface is capable of sliding adjacent the second substantially flat surface.

22. The portable electronic device of claim 21, wherein the plurality of input devices are recessed into the first substantially flat surface and are clustered at a plurality of positions around and inside a perimeter of the base component.

23. The portable electronic device of claim 21, wherein the display component is configured to:
present an image on the display surface in at least one of a first visual orientation relative to the at least one input device or a second visual orientation relative to the at least one input device.

24. The portable electronic device of claim 23, wherein the display component is configured to:
electronically rotate the image on the display surface to create at least one of the first visual orientation or the second visual orientation.

25. The portable electronic device of claim 21, further comprising:
an omnidirectional antenna coupled to at least one of the base component or the display component to enable wireless communication.

* * * * *

UNITED STATES PATENT AND TRADEMARK OFFICE
CERTIFICATE OF CORRECTION

PATENT NO.          : 8,243,021 B2                                        Page 1 of 1
APPLICATION NO.     : 11/394869
DATED               : August 14, 2012
INVENTOR(S)         : Feightner et al.

It is certified that error appears in the above-identified patent and that said Letters Patent is hereby corrected as shown below:

On the Title page, in column 1, Item (75), "Inventor", line 5, after "Khanh", delete "Q", and insert --Q.--, therefor Signed and Sealed this
Second Day of December, 2014

Michelle K. Lee
*Deputy Director of the United States Patent and Trademark Office*